United States Patent
Liu et al.

(10) Patent No.: US 10,198,130 B2
(45) Date of Patent: Feb. 5, 2019

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Hailin Xue, Beijing (CN); Haisheng Wang, Beijing (CN); Hongjuan Liu, Beijing (CN); Shengji Yang, Beijing (CN); Weijie Zhao, Beijing (CN); Xiaoliang Ding, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 14/647,976

(22) PCT Filed: Sep. 26, 2014

(86) PCT No.: PCT/CN2014/087598
§ 371 (c)(1),
(2) Date: Aug. 26, 2015

(87) PCT Pub. No.: WO2015/180335
PCT Pub. Date: Dec. 3, 2015

(65) Prior Publication Data
US 2015/0378474 A1    Dec. 31, 2015

(30) Foreign Application Priority Data

May 30, 2014   (CN) .......................... 2014 1 0239885

(51) Int. Cl.
G06F 3/044   (2006.01)
G06F 3/041   (2006.01)
G09G 3/00    (2006.01)

(52) U.S. Cl.
CPC ............ *G06F 3/044* (2013.01); *G06F 3/0412* (2013.01); *G09G 3/00* (2013.01)

(58) Field of Classification Search
CPC .......... G06F 3/044; G06F 3/0412; G09G 3/00
See application file for complete search history.

(56) References Cited

U.S. PATENT DOCUMENTS 9,024,913 B1 * 5/2015 Jung ....................... G06F 3/044
                                                    345/174
9,195,089 B2   11/2015 Lee
(Continued)

FOREIGN PATENT DOCUMENTS

CN        102466907 A    5/2012
CN        102914920 A    2/2013
(Continued)

OTHER PUBLICATIONS

Second Chinese Office Action dated Oct. 17, 2016; Appln. No. 201410239885.0.
(Continued)

*Primary Examiner* — Nitin Patel
*Assistant Examiner* — Robert M Stone
(74) *Attorney, Agent, or Firm* — Ladas & Parry LLP; Loren K. Thompson (57) ABSTRACT

An in-cell touch panel and a display device are disclosed. The in-cell touch panel includes a top substrate and a bottom substrate disposed oppositely to each other, a common electrode layer disposed on a side of the bottom substrate that faces the top substrate and a touch sensing chip. The common electrode layer is partitioned into a plurality of (Continued)

independent self-capacitance electrodes and a plurality of wires for connecting the self-capacitance electrodes to the touch sensing chip. The touch sensing chip is configured to apply common electrode signals to self-capacitance electrodes in a display interval and determine touch positions by detecting capacitance value variation of self-capacitance electrodes in a touch interval. No additional layer is needed for the in-cell touch panel, thereby saving production costs and improving production efficiency.

19 Claims, 7 Drawing Sheets

(56) References Cited

U.S. PATENT DOCUMENTS

| | | | | |
|---|---|---|---|---|
| 2010/0060602 | A1* | 3/2010 | Agari | G06F 3/044 345/173 |
| 2010/0194697 | A1* | 8/2010 | Hotelling | G06F 3/0412 345/173 |
| 2012/0086654 | A1* | 4/2012 | Song | G06F 3/0412 345/173 |
| 2012/0105337 | A1 | 5/2012 | Jun et al. | |
| 2012/0218199 | A1* | 8/2012 | Kim | G06F 3/0412 345/173 |
| 2013/0033439 | A1* | 2/2013 | Kim | G02F 1/13338 345/173 |
| 2013/0154996 | A1* | 6/2013 | Trend | G06F 3/044 345/174 |
| 2013/0307817 | A1 | 11/2013 | Kim | |
| 2014/0062907 | A1* | 3/2014 | Kim | G06F 3/038 345/173 |
| 2014/0062943 | A1 | 3/2014 | Choi et al. | |
| 2014/0132560 | A1 | 5/2014 | Huang et al. | |
| 2014/0176465 | A1 | 6/2014 | Ma et al. | |
| 2014/0210774 | A1* | 7/2014 | Kim | G06F 3/044 345/174 |
| 2014/0362031 | A1* | 12/2014 | Mo | G09G 3/36 345/174 |
| 2015/0309634 | A1* | 10/2015 | Lee | G06F 3/0412 345/173 |
| 2015/0378474 | A1 | 12/2015 | Liu et al. | |
| 2016/0018922 | A1 | 1/2016 | Wang et al. | |
| 2016/0259445 | A1* | 9/2016 | Yang | G06F 3/044 |
| 2016/0282976 | A1* | 9/2016 | Yang | G06F 3/044 |

FOREIGN PATENT DOCUMENTS

| | | |
|---|---|---|
| CN | 103279245 A | 9/2013 |
| CN | 103293785 A | 9/2013 |
| CN | 103793120 | 5/2014 |
| CN | 103793120 A | 5/2014 |
| CN | 104020891 A | 9/2014 |
| CN | 104020905 A | 9/2014 |
| CN | 104020906 A | 9/2014 |
| CN | 104035639 A | 9/2014 |
| CN | 104035640 A | 9/2014 |
| TW | M453900 U | 5/2013 |

OTHER PUBLICATIONS

International Search Report and Written Opinion dated Mar. 2, 2015; PCT/CN2014/087598.

Third Chinese Office Action dated Dec. 30, 2016; Appln. No. 201410239885.0.

First Chinese Office Action dated May 27, 2016; Appln. No. 201410239885.0.

Extended European Search Report dated Dec. 14, 2017; Appln. No. 14863057.7.

* cited by examiner

IN-CELL TOUCH PANEL AND DISPLAY DEVICE

TECHNICAL FIELD

At least one embodiment of the present invention relates to an in-cell touch screen and a display device.

BACKGROUND

With the fast development of display technology, touch screen panels have become popular in people's life gradually. At present, according to constitution structures, touch screens may be classified into add-on mode touch panels, on-cell touch panels and in-cell touch panels. For an add-on mode touch panel, the touch panel and the liquid crystal display (LCD) are produced separately and then attached together to form a liquid crystal display with touch function. Add-on mode touch panels suffer disadvantages such as high manufacturing cost, low light transmission rate and thick assembly. For an in-cell touch panel, touch electrodes of the touch panel are embedded inside the liquid crystal display, which can reduce the overall thickness of the module, and can drastically reduce manufacturing cost of the touch panel. Therefore, in-cell touch panels have received good graces from panel manufacturers.

Figure 1:
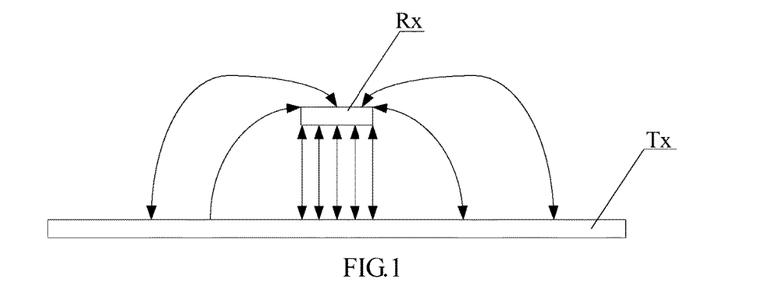
FIG. 1 is a schematic diagram of capacitance generated between touch driving electrodes and touch sensing electrodes.

At present, a capacitive in-cell touch panel is implemented by directly adding touch driving electrodes and touch sensing electrodes on a TFT (Thin Film Transistor) array substrate, that is, manufacturing two layers of strip ITO (Indium Tin Oxide) electrodes intersecting each other on different planes on the TFT array substrate, which functions as touch driving electrodes and touch sensing electrodes respectively. As shown in FIG. 1, transversely arranged touch driving electrodes Tx and longitudinally arranged touch sensing electrodes Rx couple with each other to generate mutual capacitance Cm. When a finger touches the screen, the touch action can change the value of mutual capacitance Cm. The touch detection device can detect position of the touch point of the finger by detecting variation amount of electric current corresponding to capacitance Cm before and after the touch action.

Two kinds of mutual capacitances Cm are formed between transversely arranged touch driving electrodes Tx and longitudinally arranged touch sensing electrodes Rx. As shown in FIG. 1, one kind is the projection capacitance effective for implementing touch function (as shown by arrowed curve line in FIG. 1). When a finger touches the screen, the projection capacitance value may be changed. Another kind is the direct opposing capacitance non-effective for implementing touch function (as shown by the arrowed straight line). When a finger touches the screen, the direct opposing capacitance value would not bed changed.

SUMMARY

At least one embodiment of the present invention provides an in-cell touch panel and a display device to realize an in-cell touch panel with high touch precision, low cost, high production efficiency and high transmittance.

At least one embodiment of the present invention provides an in-cell touch panel including: a top substrate and a bottom substrate disposed oppositely to each other, a common electrode layer disposed on a side of the bottom substrate that faces the top substrate and a touch sensing chip. The common electrode layer is partitioned into a plurality of independent self-capacitance electrodes and a plurality of wires for connecting the self-capacitance electrodes to the touch sensing chip. The touch sensing chip is configured to apply common electrode signals to self-capacitance electrodes in a display interval and determine touch positions by detecting capacitance value variation of self-capacitance electrodes in a touch interval.

At least one embodiment of the present invention provides a display device including the above-mentioned in-cell touch panel provided in embodiments of the present invention.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventors of the present application have noted that in the structure design of the capacitive in-cell touch panel shown in FIG. 1, the body capacitance can couple with only the projection capacitance in the mutual capacitance, while direct opposing capacitance formed at the positions where touch driving electrodes directly face touch sensing electrodes can lower the signal-to-noise ratio of a touch panel and in turn influence the accuracy of touch sensing in the in-cell touch panel. Also, it is required to add two new layers on the TFT array substrate, which entails new process while manufacturing TFT array substrate, increase production costs and is adverse to increase of production efficiency.

At present, liquid crystal display technologies capable of realizing wide viewing angle mainly include In-Plane Switch (IPS) technology and Advanced Super Dimension Switch (ADS) technology. In the ADS technology, a multidimensional electric field is formed with both an electric field produced at edges of slit electrodes on the same plane and an electric field produced between a slit electrode layer and a plate electrode layer, so that liquid crystal molecules at all orientations, which are located directly above the electrodes and between the slit electrodes in a liquid crystal cell, can be rotated, which enhances the work efficiency of liquid crystals and increases light transmittance. The Advanced-Super Dimensional Switching technology can improve the picture quality of TFT-LCDs and has advantages of high resolution, high transmissivity, low power dissipation, wide viewing angles, high opening ratio, low chromatic aberration, and no push Mura, etc.

At least one embodiment of the present invention proposes a capactive in-cell touch panel based on ADS technology and an improved mode of ADS, namely H-ADS (high aperture ratio ADS).

Specific implementations of the in-cell touch panel and display device provided in embodiments of the present invention will be described in detail below with reference to accompanying drawings.

Thicknesses and shapes of layers in the accompanying drawings do not reflect real scale, and only serve to illustrate contents of the present invention.

Figure 2:
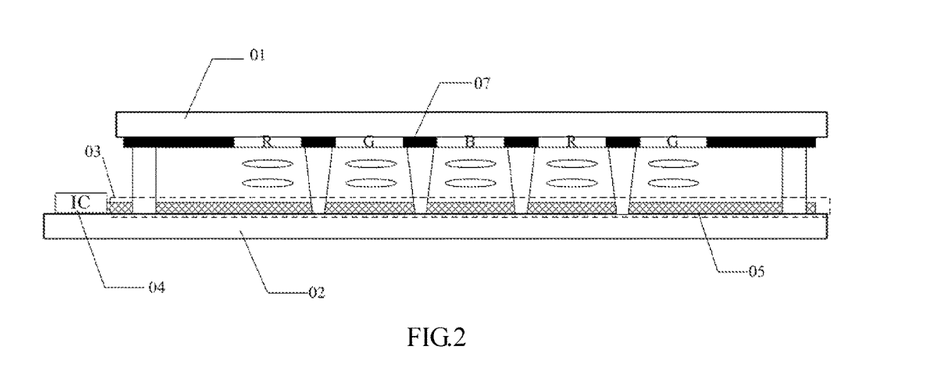
FIG. 2 is a structural view of an in-cell touch panel provided in an embodiment of the present invention.
Figure 3:
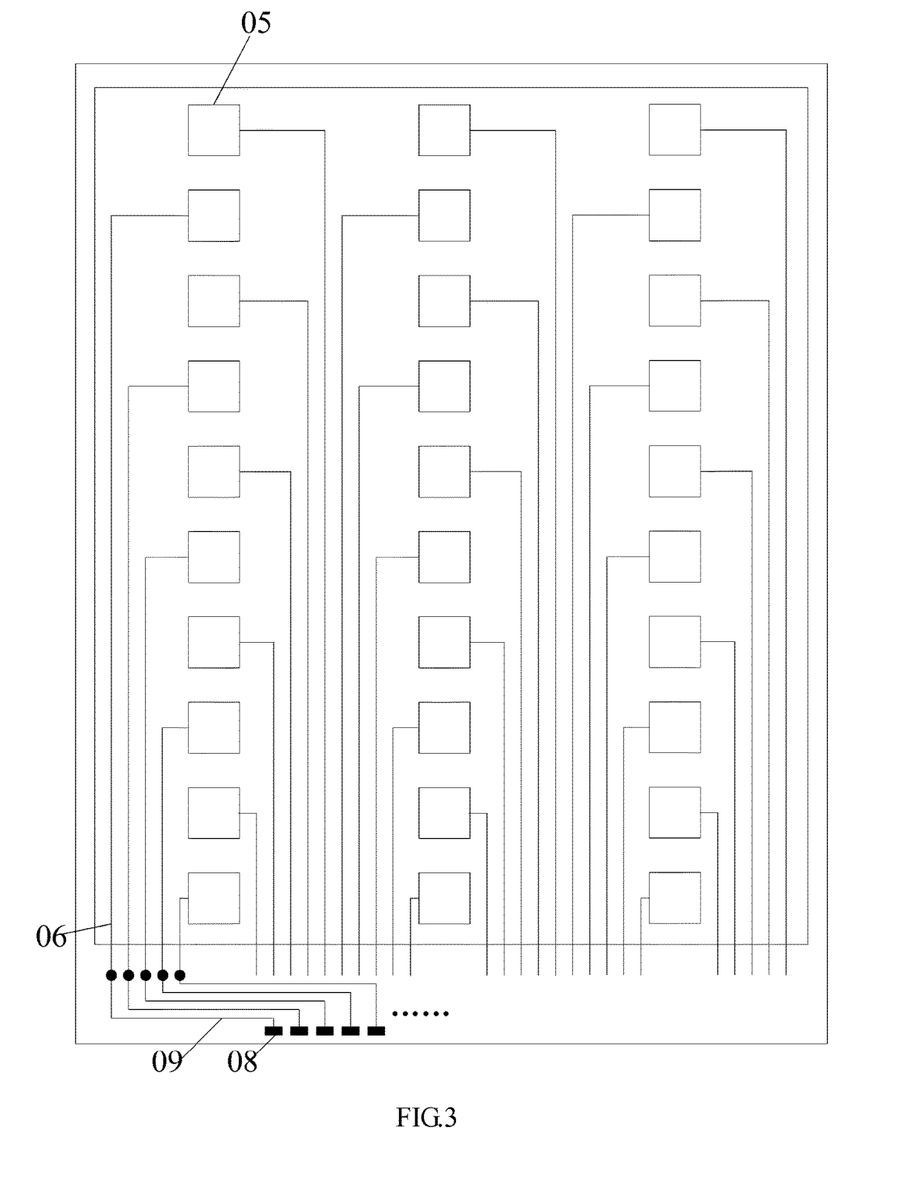
FIG. 3 is a top structural view of an in-cell touch panel provided in an embodiment of the present invention.

At least one embodiment of the present invention provides an in-cell touch panel as shown in FIG. 2, including a top substrate 01 and a bottom substrate 02 disposed oppositely to each other, a common electrode layer 03 disposed on a side of the bottom substrate 02 that faces the top substrate 01, and a touch sensing chip 04. As shown in FIG. 3, the common electrode layer 03 is partitioned into a plurality of independent self-capacitance electrodes 05 and a plurality of wires 06 for connecting self-capacitance electrodes 05 to the touch sensing chip 04. The touch sensing chip 04 is configured to apply common electrode signals to self-capacitance electrodes 05 in a display interval and determine touch positions by detecting capacitance value variation of self-capacitance electrodes 05 in a touch interval.

For the above-mentioned in-cell touch panel provided III an embodiment of the present invention, a plurality of self-capacitance electrodes 05 disposed on the same layer and independent from each other are provided on the bottom substrate 02 of the touch panel in accordance with the self-capacitance principle. When a human body does not touch the screen, each self-capacitance electrode 05 experiences capacitance at a fixed value. When a human body touches the screen, respective self-capacitance electrodes 05 experience capacitance at a value of the fixed value plus the body capacitance. The touch sensing chip 04 determines the touch position by detecting capacitance value variation of self-capacitance electrodes in a touch period. Since the body capacitance can act on all the self-capacitances, as compared to the situation in which the body capacitance that can only act on projection capacitance in mutual capacitance, the touch variation caused by body touch on the screen would be large, and it is therefore possible to effectively enhance signal-to-noise ratio of touch and in turn enhance accuracy of touch sensing.

Upon specific implementation, in order to effectively detect capacitance value variations of self-capacitance electrodes 05, the touch sensing chip 04 may apply driving signals to self-capacitance electrodes 05 in a touch interval and receive feedback signals from self-capacitance electrodes 05. Since the capacitance value variation caused by touching on self-capacitance electrode 05 can increase the RC delay of feedback signals, it is possible to determine whether a self-capacitance electrode 05 is touched and in turn locate the touch position by determining the RC delay of feedback signals of self-capacitance electrodes 05. Of course, the touch sensing chip 04 may also judge capacitance value variation of self-capacitance electrodes 05 in other ways such as detecting charge variation to determine touch position, which is not described any more here.

In the above-mentioned touch panel provided in an embodiment of the present invention, the common electrode layer 03 is reused/multiplexed as self-capacitance electrodes 05 by modifying pattern of common electrode layer 03 on the bottom substrate 02 to form a plurality of independent self-capacitance electrodes 05 and also wires 06 for connecting self-capacitance electrodes 05 to the touch sensing chip 04. As compared to the approach in which two new layers are added in an array substrate while implementing touch function in accordance with mutual capacitance principle, no additional layer is added for the touch panel provided in embodiments of the present invention, it is only required to pattern the original common electrode layer 03 to form patterns of corresponding self-capacitance electrodes 05 and wires 06, which saves production costs and improves production efficiency.

Generally, on the bottom substrate in a traditional ADS type liquid crystal panel, common electrodes are located on the lower layer as plate electrodes (closer to the base substrate), pixel electrodes are located on the upper layer as slit electrodes (closer to the liquid crystal layer), and an insulating layer is provided between the pixel electrodes and the common electrodes. On the array substrate in an H-ADS type liquid crystal panel, pixel electrodes are located on the lower layer as plate electrodes (closer to the base substrate), common electrodes are located on the upper layer as slit electrodes (closer to the liquid crystal layer), and an insulating layer is provided between the pixel electrodes and the common electrodes.

In a different embodiment, according to the mode of liquid crystal display panel to which the above-mentioned touch panel is applied, self-capacitance electrodes 05 forming the common electrode layer may have a slit-like ITO electrode structure or a plate ITO electrode structure at locations corresponding to opening regions of pixel units. For example, in an HADS mode, self-capacitance electrodes 05 include slit-like ITO electrodes. For example, the slit-like ITO electrode structure is an ITO electrode having slits in opening regions of pixels. For example, in an ADS mode, self-capacitance electrodes 05 may include plate ITO electrodes to meet requirements of liquid crystal display. Then self-capacitance electrode 05 may interact with a human body electric field via the slit regions of pixel electrodes. Since technologies known by those skilled in the art may be used for specific structures of ADS and HADS modes of liquid crystal panels, they will not be described here any more here.

In one embodiment, in order to increase variation caused by self-capacitance electrodes 05 sensing body capacitance in touch interval, it is possible to dispose the common electrode layer including self-capacitance electrodes 05 over pixel electrodes in the bottom substrate 02, namely adopting an H-ADS mode, to make self-capacitance electrodes 05 as close to the top substrate 01 as possible.

In specific implementations, it is possible to adopt any patterning flow to manufacture layers on the bottom substrate 02. For example, eight (8) patterning processes may be used: gate and gate line patterning→active layer patterning→first insulating layer patterning→data line and source/drain patterning→resin layer patterning→pixel electrodes patterning→second insulating layer patterning→common electrode layer patterning. Of course, seven (7) patterning processes, six (6) or five (5) patterning processes may also be used according to practical designs, which is not limited herein.

Since in the above-mentioned touch panel provided in embodiments of the present invention, the common electrode layer 03 is reused as self-capacitance electrodes 05, in one embodiment, a time-division driving mode for touch and display intervals is adopted. Also, in one embodiment, it is also possible to integrate the display driving chip and the touch sensing chip into one chip to further reduce the production costs.

Figure 4A:
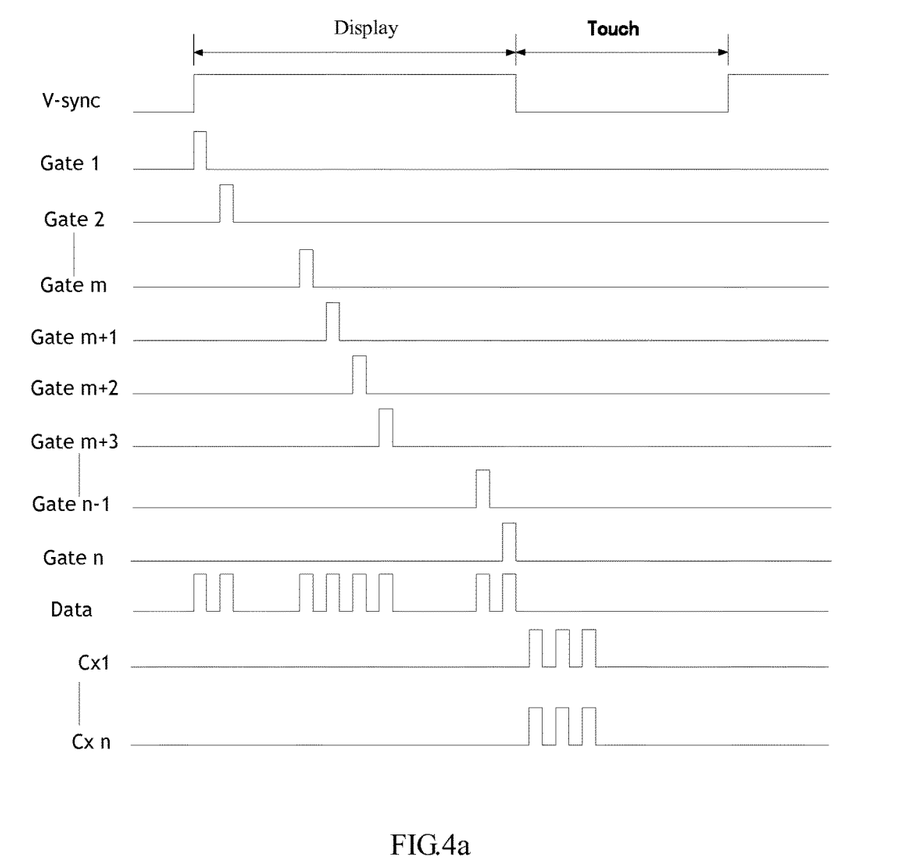
FIGS. 4*a* and 4*b* are driving time sequence diagrams of an in-cell touch panel provided in an embodiment of the present invention.
Figure 4B:
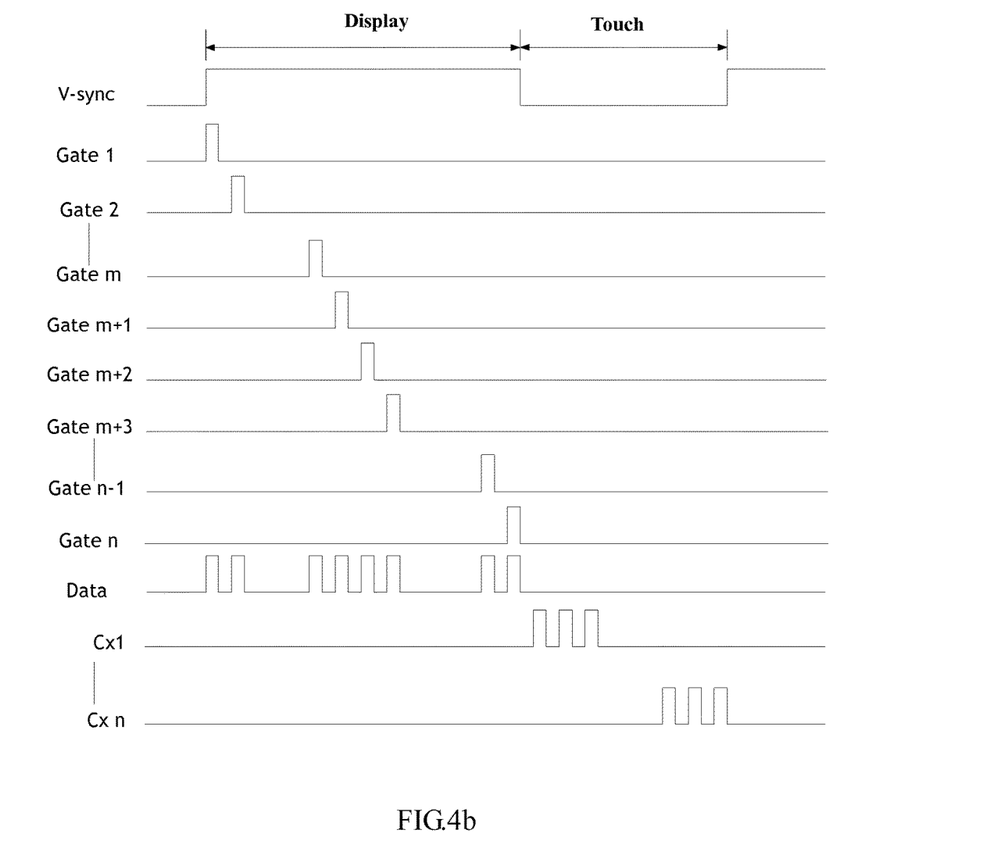

For example, in the driving timing sequence diagram shown in FIGS. 4a and 4b, the time period for the touch panel to display each frame (V-sync) is divided into a display interval (Display) and a touch interval (Touch). For example, in the driving timing sequence diagram shown in FIGS. 4a and 4b, the time period for the touch panel to display one frame is 16.7 ms in which 5 ms is selected as a touch interval and the other 11.7 ms as a display interval. Of course it is also possible to appropriately adjust durations of both according to the processing capacity of IC chips, which is not specifically limited here. In the display interval (Display), each gate signal line Gate 1, Gate 2 . . . Gate n in the touch panel is applied with gate scanning signals successively, data signal line Data is applied with gray scale signals, and the touch sensing chip connected with self-capacitance electrodes Cx 1 . . . Cx n applies common electrode signals to self-capacitance electrodes Cx 1 . . . Cx n respectively to implement liquid crystal display function. In the touch interval (Touch), as shown in FIG. 4a, the touch sensing chip connected with self-capacitance electrodes Cx 1 . . . Cx n applies driving signals to self-capacitance electrodes Cx 1 . . . Cx n at the same time, and receives feedback signals of self-capacitance electrodes Cx 1 . . . Cx n at the same time. Alternatively, as shown in FIG. 4b, it is also possible that the touch sensing chip connected with self-capacitance electrodes Cx 1 . . . Cx n applies driving signals to self-capacitance electrodes Cx 1 . . . Cx n successively, and receives feedback signals of self-capacitance electrodes Cx 1 . . . Cx n respectively, which is not limited herein. Touch function is implemented by analyzing feedback signals to determine whether any touch occurs.

The resolution for touch panel is generally on the order of millimeter. Therefore, in specific implementations, it is possible to choose density of and the area occupied by self-capacitance electrodes 05 according to the required touch resolution to ensure the required touch density. Generally, self-capacitance electrodes 05 are designed as square electrodes of 5 mm*5 mm. The resolution for display screen is generally on the order of microns, therefore one self-capacitance electrode 05 generally may correspond to a plurality of pixel units in the display screen. In the above-mentioned in-cell touch panel provided in the embodiment of the present invention, the common electrode layer 03 disposed in its entirety on the bottom substrate 02 is partitioned into a plurality of self-capacitance electrodes 05 and corresponding wires 06, and in order not to influence normal display function, while partitioning the common electrode layer 03, partition lines are generally kept clear of opening regions for display and disposed in regions corresponding to the pattern of black matrix layer.

In one embodiment, as shown in FIG. 2, the above-mentioned touch panel provided in the embodiment of the present invention may further include: a black matrix layer 07 disposed on a side of the top substrate 01, which side faces the bottom substrate 02, or a side of the bottom substrate 02, which side faces the top substrate 01. Orthogonal projections of partitioning gaps between adjacent two self-capacitance electrodes 05 on the bottom substrate 02 are all within regions in which the pattern of black matrix layer 07 is located. Orthogonal projections of patterns of wires 06 on the bottom substrate 02 are all within regions in which the pattern of black matrix layer 07 is located.

While designing touch panel with self-capacitance principle, as shown in FIG. 3, each self-capacitance electrode 05 is generally connected to the touch sensing chip 04 through a separate lead-out wire. In one embodiment, each lead-out wire may include: a wire 06 for connecting the self-capacitance electrode 05 to the margin frame of the touch panel, and a periphery wiring 09 disposed at the margin frame for connecting the self-capacitance electrode 05 to connection terminal 08 of the touch sensing chip, that is, periphery wiring 09 is electrically connected with a connection terminal 08 of the touch sensing chip 04. Generally, periphery wirings 09 and connection terminals 08 of the touch sensing chip 04 may be disposed in the margin frame on a side of the bottom substrate 02 that faces the top substrate 01. Therefore, self-capacitance electrodes 05 may be connected to the margin frame of the in-cell touch panel by wires 06 firstly, and then electrically connected to corresponding periphery wirings 09.

Upon specific implementations, since there are many self-capacitance electrodes 05, there are also many corresponding lead-out wires. Considering an example in which each self-capacitance electrode 05 occupies an area of 5 mm*5 mm, a 5 inch liquid crystal display would require 264 self-capacitance electrodes 05. If each self-capacitance electrode 05 is designed smaller, there will be provided more self-capacitance electrodes 05, and more lead-out wires need to be provided. Since wires 06 in lead-out wires and self-capacitance electrodes 05 are both disposed on the common electrode layer 03, and in order not to influence normal display, the pattern of black matrix layer 07 may cover all wires 06, which would result in many patterns of black matrix layer 07 that cover wires 06 and thereby disadvantageously influencing aperture ratio of pixel units. In addition, many wires 06 would require many periphery wirings 09 connected one by one with the wires disposed at the margin frame, which could enlarge the margin frame of touch panel and is adverse to the narrow margin frame design.

Figure 5:
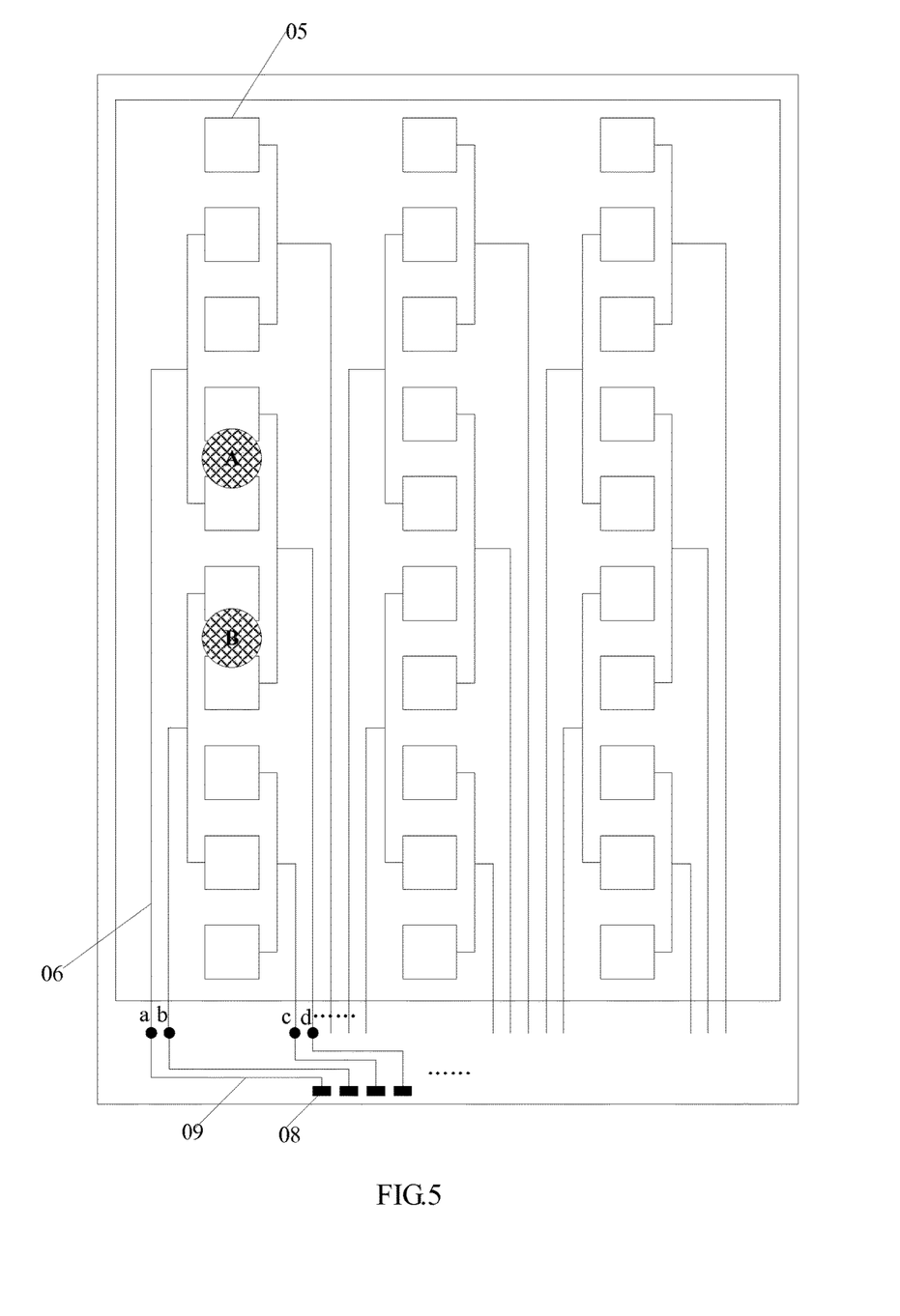
FIG. 5 is a top structural view of an in-cell touch panel provided in an embodiment of the present invention.

Therefore, in one embodiment of the above-mentioned touch panel provided in an embodiment of the present invention, as shown in FIG. 5, each wire 06 is electrically connected with two of every other self-capacitance electrodes 05, and the self-capacitance electrodes 05 electrically connected with different wires 06 are not the same. After connecting two of every other self-capacitance electrodes 05 to the margin frame of touch panel by one wire 06, they are connected to the touch sensing chip 04 for touch position detection by one corresponding periphery wiring 09. In this way, as compared to the one-to-one connection manner for self-capacitance electrodes 05 and wires 06 as shown in FIG. 3, the number of wires 06 will be reduced by half. Furthermore, with the decrease of the number of wires 06, the number of corresponding periphery wirings 09 would decrease also, which is also favorable to the design of narrow margin frame of a touch panel.

Furthermore, since two of every other self-capacitance electrodes 05 are connected via one wire 06, and adjacent self-capacitance electrodes 05 are connected to the margin frame via different wires 06, when a human body touches the screen, the touch sensing chip 04 can determine a touch position by determining capacitance variation of adjacent self-capacitance electrodes 05 connected with different wires 06, which can avoid misjudgment and improve accuracy of touch sensing. Taking the connection of self-capacitance electrodes 05 shown in FIG. 5 as an example, since self-capacitance electrodes 05 in x direction are not connected via the same one wire 06, it is possible to accurately determine the position in x direction. Self-capacitance electrodes 05 in y direction are connected two by two, therefore, the position in y direction needs to be determined by signal change on different wires 06. For example, when a finger touches position A, it is known from signal change on the wire d that both positions A and B may be touched. However, it may be known by the fact that the signal on the wire a changes while the signal on the wire b does not changes, that only position A is touched.

Figure 6A:
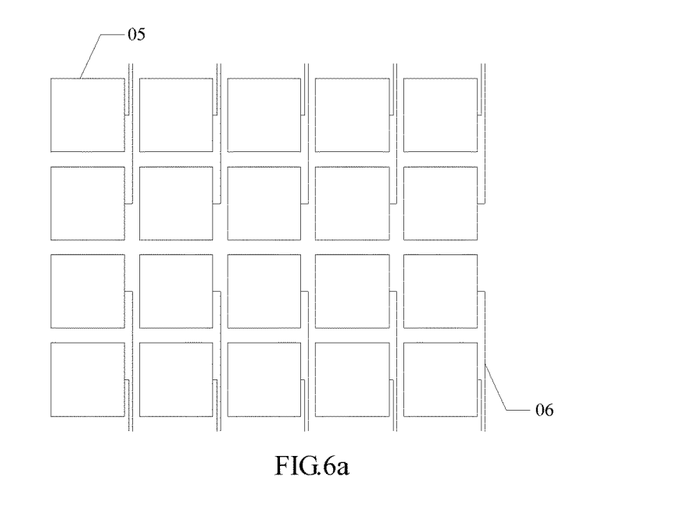
FIGS. 6*a* and 6*b* are top structural views of an in-cell touch panel provided in an embodiment of the present invention respectively.

In a different embodiment, whether wires 06 are one-to-one connected with self-capacitance electrodes 05 or each wire 06 is connected with two self-capacitance electrodes 05, while designing extension direction of wires 06, it is possible to set extension directions of wires 06 to be the same. Generally, the margin frame of a touch panel is of a rectangle shape. In one embodiment, in order to optimize the area occupied by wires, it is possible to set the extension direction of wires 06 to be consistent with the short side direction of the margin frame, that is, as shown in FIG. 6a, the wires 06 connect self-capacitance electrodes 05 to long sides of margin frame in the short side direction of the margin frame. This can reduce area occupied by wires 06 by reducing the number of wires 06 at gaps between adjacent two columns of self-capacitance electrodes 05, thereby reducing the area of the pattern of black matrix layer 07 covering wires 06 and increasing aperture ratio of pixel units.

Figure 6B:
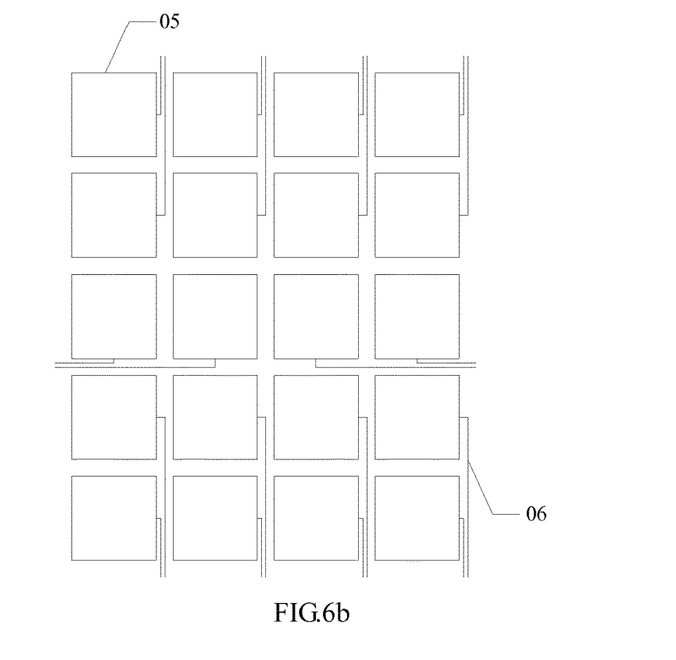

In one embodiment, in order to guarantee that pixel units have a large aperture ratio, the margin frame of touch panel generally has four sides. As shown in FIG. 6b, it is possible to connect the self-capacitance electrodes 05 to the closest side by corresponding wires 06 while ensuring the wires 06 not crossing each other, and this configuration can reduce the number of wires 06 between self-capacitance electrodes 05 as many as possible, reduce the area of the pattern of black matrix layer 07 to the maximum extent, and guarantee a large aperture ratio of pixel units.

in the in-cell touch panel provided in the embodiment of the present invention, since the body capacitance acts on the self-capacitances of self-capacitance electrodes 05 by direct coupling, when a human body touches the screen, only the self-capacitance electrode 05 under the touch position will experience large capacitance value variations, while the self-capacitance electrodes 05 adjacent the self-capacitance electrodes 05 under the touch position will experience very small capacitance value variations. Thus, for example, when a finger slides on the touch panel, it is difficult to determine touch coordinates in the region where the self-capacitance electrode 05 is located. Therefore, in one embodiment of the above-mentioned in-cell touch panel provided in embodiments of the present invention, it is possible to configure opposite sides of two adjacent self-capacitance electrodes 05 as bend lines/zigzag lines so as to increase variation amount of capacitance value of self-capacitance electrodes 05 adjacent the self-capacitance electrode 05 under the touch position.

In different implementations, it is possible to set the overall shape of self-capacitance electrodes 05 in one of or combination of the following ways.

Figure 7A:
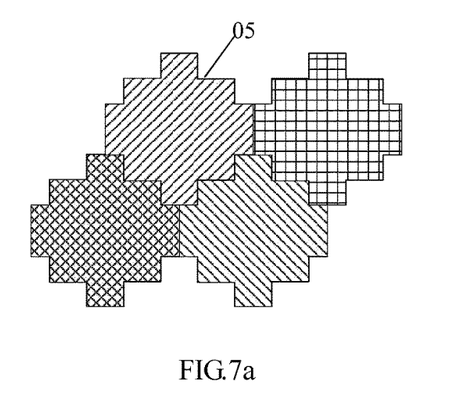
FIGS. 7*a* and 7*b* are structural views showing adjacent self-capacitance electrodes having opposite sides configured as bend lines in the in-cell touch panel provided in an embodiment of the present invention respectively.

It is possible to configure opposite sides of two adjacent self-capacitance electrodes 05 that are bend lines as step-like structures such that two step-like structures have consistent and matching structural shapes as shown in FIG. 7a that shows 2*2 self-capacitance electrodes 05.

Figure 7B:
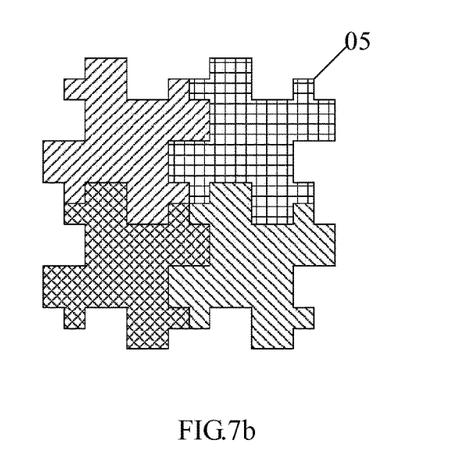

It is possible to configure opposite sides of two adjacent self-capacitance electrodes 05 that are bend lines as concave-convex structures such that two concave-convex structures have consistent and matching structural shapes as shown in FIG. 7b that shows 2*2 self-capacitance electrodes 05.

Based on the same inventive concept, at least one embodiment of the present invention further provides a display device including the above-mentioned in-cell touch panel provided in embodiments of the present invention. The display device may be any product or component having display function such as a cellphone, a tablet computer, a TV set, a display, a notebook computer, a digital picture frame and a navigator. The above-mentioned embodiments of the in-cell touch panel may be referred to for implementations of the display device and repetitions will not be described any more.

For the in-cell touch panel and display device provided in embodiments of the present invention, a plurality of self-capacitance electrodes disposed on the same layer and independent from each other are provided on the bottom substrate of a touch panel in accordance with self-capacitance principle. When a human body does not touch the screen, each self-capacitance electrode experiences a capacitance of a fixed value. When a human body touches the screen, respective self-capacitance electrodes experience capacitance at a value that is the fixed value plus the body capacitance. The touch sensing chip can determine the touch position by detecting capacitance value variation of self-capacitance electrodes in the touch period. Since the body capacitance can act on all the self-capacitances, as compared to the approach in which the body capacity that can only act on projection capacitance in mutual capacitance, the touch variation caused by body touch on the screen would be greater. Therefore, embodiments of the present invention can effectively improve signal-to-noise ratio of touch and thereby improve accuracy of touch sensing. Further, as compared to the approach in which two new layers need to be added in the array substrate while implementing touch function in accordance with the mutual capacitance principle, for the touch panel provided in embodiments of the present invention, the pattern of an ADS mode of common electrode layer is modified to form a plurality of independent self-capacitance electrodes and wires for connecting self-capacitance electrodes to the touch sensing chip. Therefore, no additional layer needs to be added, thereby saving production costs and improving production efficiency.

It is understood that one skilled in the art can make various modifications and variations to the present invention without departing from the spirit and scope of the present invention. Thus, if these modifications and variations of the present invention fall within the scope of claims and their equivalents of the present invention, it is intended that the present invention contains these modifications and variations.

The present application claims priority of China Patent application No. 201410239885.0 filed on May 30, 2014, the content of which is incorporated in its entirety as part of the present application by reference herein.

The invention claimed is:

1. An in-cell touch panel comprising a top substrate and a bottom substrate disposed oppositely to each other, a common electrode layer disposed on a side of the bottom substrate that faces the top substrate, and a touch sensing chip; wherein, the common electrode layer is partitioned into a plurality of independent self-capacitance electrodes and a plurality of wires for connecting the self-capacitance electrodes to the touch sensing chip; and the touch sensing chip is configured to apply common electrode signals to self-capacitance electrodes in a display interval and determine touch positions by detecting capacitance value variation of self-capacitance electrodes in a touch interval;

wherein each of the wires is electrically connected with two of every other self-capacitance electrodes and self-capacitance electrodes electrically connected with different wires are not the same.

2. The in-cell touch panel of claim 1, further comprising:
a black matrix layer disposed on a side of the top substrate facing the bottom substrate or on a side of the bottom substrate facing the top substrate;

wherein orthogonal projections of partitioning gaps between two adjacent self-capacitance electrodes on the bottom substrate are all located in regions in which a pattern of the black matrix layer is located; and orthogonal projections of patterns of the wires on the bottom substrate are all within the regions in which the pattern of the black matrix layer is located.

3. The in-cell touch panel of claim 2, wherein opposite sides of adjacent two of the self-capacitance electrodes are both bend lines.

4. The in-cell touch panel of claim 3, wherein the opposite sides of adjacent two self-capacitance electrodes that are bend lines both have step-like structures that are consistent and match each other.

5. The in-cell touch panel of claim 3, wherein the opposite sides of adjacent two self-capacitance electrodes that are bend lines both have concave-convex structures that are consistent and match each other.

6. The in-cell touch panel of claim 2, wherein each of the wires is electrically connected with two of every other self-capacitance electrodes and self-capacitance electrodes electrically connected with different wires are not the same.

7. The in-cell touch panel of claim 2, further comprising:
periphery wirings electrically connected with connection terminals of the touch sensing chip;

wherein the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings.

8. The in-cell touch panel of claim 7, wherein the margin frame of the in-cell touch panel is of a rectangle shape, and the wires connect the self-capacitance electrodes to a long side of the margin frame in a short side direction of the margin frame.

9. The in-cell touch panel of claim 7, wherein the margin frame of the in-cell touch panel has four sides, and each of the self-capacitance electrodes are connected to a closest side via a corresponding one of the wires while the wires do not intersect each other.

10. The in-cell touch panel of claim 1, wherein opposite sides of adjacent two of the self-capacitance electrodes are both bend lines.

11. The in-cell touch panel of claim 1, wherein opposite sides of adjacent two of the self-capacitance electrodes are both bend lines;

wherein the opposite sides of adjacent two self-capacitance electrodes that are bend lines both have step-like structures that are consistent and match each other.

12. The in-cell touch panel of claim 1, wherein opposite sides of adjacent two of the self-capacitance electrodes are both bend lines;

wherein the opposite sides of adjacent two self-capacitance electrodes that are bend lines both have concave-convex structures that are consistent and match each other.

13. The in-cell touch panel of claim 1, further comprising:
periphery wirings electrically connected with connection terminals of the touch sensing chip;

wherein the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings.

14. The in-cell touch panel of claim 13, wherein the margin frame of the in-cell touch panel is of a rectangle shape, and the wires connect the self-capacitance electrodes to a long side of the margin frame in a short side direction of the margin frame.

15. The in-cell touch panel of claim 13, wherein the margin frame of the in-cell touch panel has four sides, and each of the self-capacitance electrodes are connected to a closest side via a corresponding one of the wires while the wires do not intersect each other.

16. The in-cell touch panel of claim 1, wherein opposite sides of adjacent two of the self-capacitance electrodes are both bend lines;

wherein each of the wires is electrically connected with two of every other self-capacitance electrodes and self-capacitance electrodes electrically connected with different wires are not the same.

17. The in-cell touch panel of claim 1, further comprising: periphery wirings electrically connected with connection terminals of the touch sensing chip;

wherein opposite sides of adjacent two of the self-capacitance electrodes are both bend lines;

wherein the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings.

18. The in-cell touch panel of claim 1, further comprising:
periphery wirings electrically connected with connection terminals of the touch sensing chip;

wherein the periphery wirings and the connection terminals of the touch sensing chip are disposed at a margin frame on a side of the bottom substrate that faces the top substrate; and the self-capacitance electrodes are connected to the margin frame of the in-cell touch panel by the wires and then electrically connected with corresponding periphery wirings.

19. A display device comprising the in-cell touch panel of claim 1.

\* \* \* \* \*